(12) United States Patent
McAfee

(10) Patent No.: US 7,689,627 B2
(45) Date of Patent: Mar. 30, 2010

(54) IDENTITY MANAGEMENT

(75) Inventor: R. Preston McAfee, San Marino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 381 days.

(21) Appl. No.: 11/872,648

(22) Filed: Oct. 15, 2007

(65) Prior Publication Data

US 2009/0100066 A1    Apr. 16, 2009

(51) Int. Cl.
*G06F 7/00* (2006.01)
(52) U.S. Cl. .................................. 707/783; 707/784
(58) Field of Classification Search ................ 707/1–10
See application file for complete search history.

(56) References Cited

U.S. PATENT DOCUMENTS 5,961,593 A    10/1999  Gabber et al.
2004/0260651 A1  12/2004  Chan et al.
2006/0085431 A1*  4/2006  Burns et al. ................... 707/10
2006/0106793 A1*  5/2006  Liang ............................ 707/5
2007/0219958 A1*  9/2007  Park et al. ...................... 707/3
2008/0033961 A1*  2/2008  Berglund et al. .............. 707/10

FOREIGN PATENT DOCUMENTS

KR    10-2002-0003140 A    1/2002
KR    10-2002-0004168 A    1/2002

* cited by examiner

*Primary Examiner*—Wilson Lee
(74) *Attorney, Agent, or Firm*—Baker Botts L.L.P.

(57) ABSTRACT

A method which may allow a user to create more than one online identity in a Web browser, and associate each online identity with one type of intended online activity. The user may be able to switch to a different online identity without logging out from his/her computer or Web browser. The invention may help users to evade websites' tracking and targeting functions and protect users' privacy. Since each online identity may be associated with only a part of a user's browsing history, it is difficult for websites to collect all information about the user.

25 Claims, 5 Drawing Sheets

| Online Identity | Password | Intended Use | Shipping Address | Credit Card | Email address | Web Pages Browsed |
|---|---|---|---|---|---|---|
| L. Bright | xxxxx | Luxury goods | xxxxxx | xxxxx | xxxxx | |
| B. Bright | xxxxx | Bargains | xxxxxxx | xxxxx | xxxxx | |
| C. Bright | xxxxx | Cars | | | xxxxx | |
| S. Bright | xxxxx | Stamps | | | xxxxx | |

Fig. 3

IDENTITY MANAGEMENT

BACKGROUND

1. Field of the Invention

The present invention relates generally to the Internet, and more particularly to a method for facilitating users to create and manage their online identities to evade websites' tracking functions.

2. Description of Related Art

The explosive growth of the Internet makes life much more convenient. Users may access all types of information and do online shopping from home. However, that activity potentially exposes users' personal information and online activities, and thus may place the user in a disadvantageous position.

For example, some websites use cookies to track their users and collect users' online activity information. By analyzing the cookies, a website may find out the user's interested areas and provide targeted information to the user. But the user may prefer some privacy and may not want to expose all his/her areas of interest to the websites.

In another example, some online businesses collect users' online commercial transactions in their websites, analyze users' habits, and then provide targeted advertisements and promotions. If a website finds out that a user likes to buy luxury goods, the site may stop sending coupons or discount information to the user, so as to make more money from the user. However, the user may like bargains for some goods and may not want to be subjected to this kind of price discrimination.

To hide from the websites and prevent websites from manipulating browsing history information, a user may pretend to be more than one person by using a number of computers, a number of Internet Service Providers (ISPs), a number of email addresses, different login information for an operating system, or browsers from different companies. However, using more computers or more ISPs is expensive. In addition, the user has to remember what each computer, ISP, email address or login information is for. Further, none of these approaches allows the user to change from one online identity to another conveniently. For example, the user may use one set of operating system login information for luxury shopping, and use another set for bargain hunting. However, the user may have to close all applications and log out from the operating system if he/she wants to change from a shopper for luxury goods to a bargain hunter, or vise versa.

Therefore, it may be desirable to provide a method which allows users to create and manage their online identities, so as to protect users from websites' tracking and targeting functions.

BRIEF DESCRIPTION OF THE DRAWING FIGURES

Embodiments of the present invention are described herein with reference to the accompanying drawings, similar reference numbers being used to indicate functionally similar elements.

FIG. 3 shows an online identity information table according to an embodiment of the present invention.

DETAILED DESCRIPTION

The present invention provides a method which may allow a user to create more than one online identity in a Web browser, and associate each online identity with one type of intended online activity. The user may be able to switch from one online identity to another without logging out from his/her computer or Web browser. The invention may help users to evade websites' tracking and targeting functions and protect users' privacy. Since each online identity may be associated with only a part of a user's browsing history, it is difficult for websites to collect all of a user's information. In addition, websites may regard each online identity as a "user," analyze browsing behaviors of that "user," and send to that "user" information targeted at him/her. Accordingly, the user may turn websites' tracking and targeting functions into his/her favor, using one online identity to induce one type of information and using another online identity to induce another type of information.

The invention may be carried out by computer-executable instructions, such as program modules. The program may be written with various programming languages. One example of the programming language is JavaScript. The program may be an integrated part of a Web browser, or may be delivered to a user as a tool bar, so that the user may install it into his/her browser. Advantages of the present invention will become apparent from the following detailed description.

Figure 1:
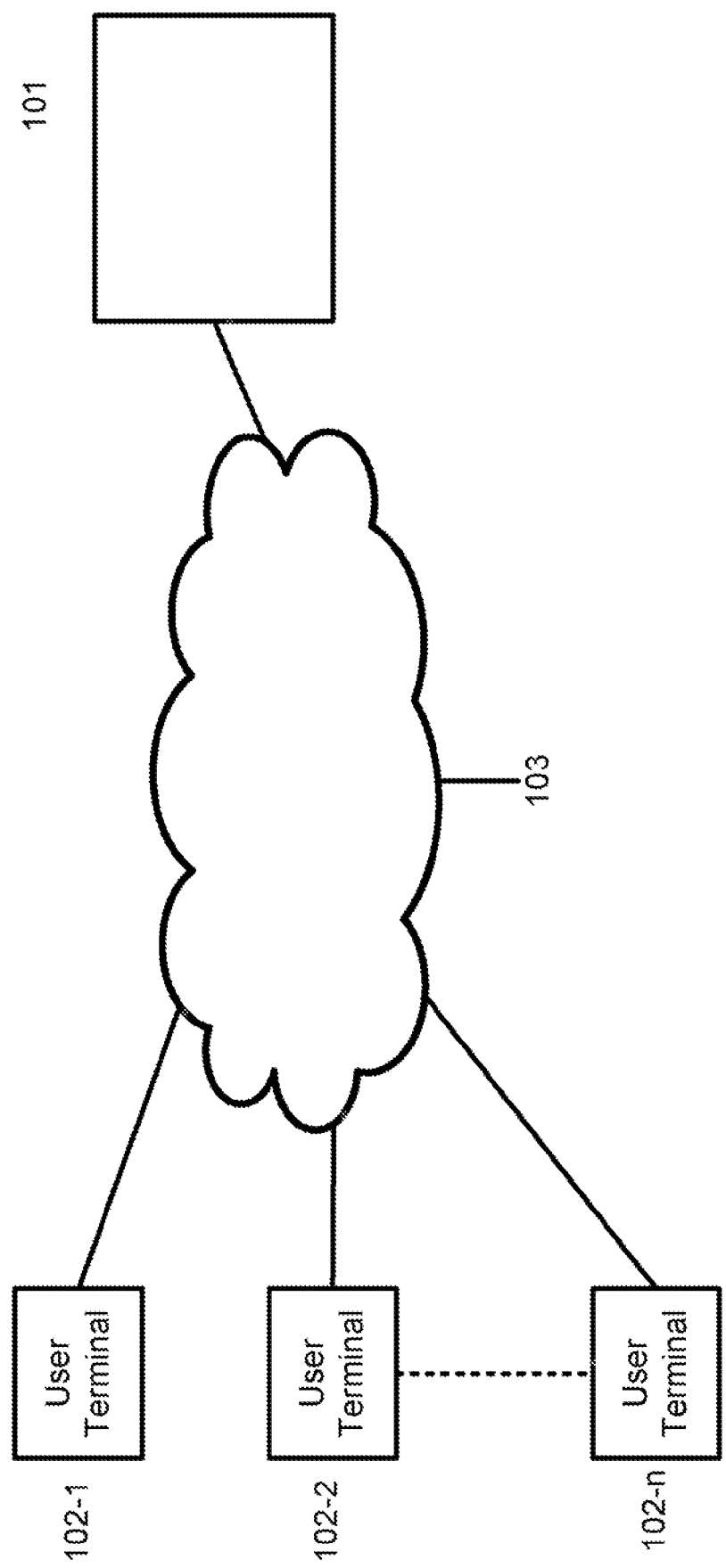
FIG. 1 illustrates an exemplary environment in which the method of the present invention may be used.

FIG. 1 illustrates an exemplary environment in which the method of the present invention may be used. As shown, a server 101 may communicate over a network 103 with a number of user terminals, or browsing devices, 102-1, 102-2, . . . 102-$n$. The server 101 may be a computer system, which may include one or more of a screen, an input device, a processing unit, a system memory, and a system bus coupling various components in the computer system.

The user terminals 102 may be personal computers, handheld or laptop devices, microprocessor-based systems, set top boxes, or programmable consumer electronics. Each user terminal may have a Web browser configured to receive and display web pages, which may include text, graphics, multimedia, etc. The web pages may be based on, e.g., HyperText Markup Language (HTML) and a Wireless Application Protocol (WAP). The Web browser may allow a user to customize the appearance of web pages.

Figure 2:
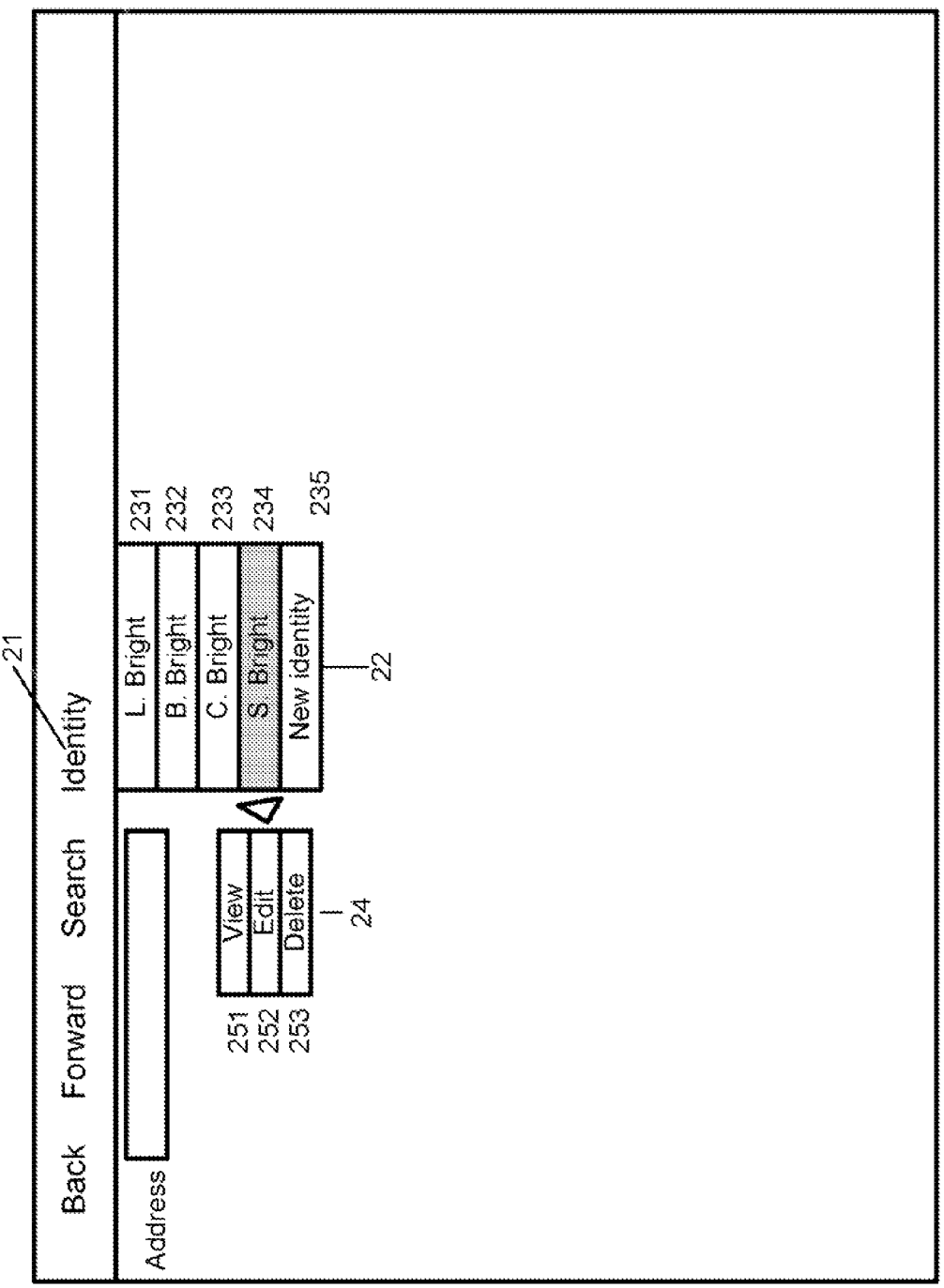
FIG. 2 shows a user interface of a Web browser according to one embodiment of the present invention.

FIG. 2 shows a user interface of a Web browser according to one embodiment of the present invention. As shown, the Web browser may include a button 21 for online identity management. When a user clicks on the button 21, a pull-down menu 22 may be displayed. The pull-down menu 22 may include a number of online identity buttons, e.g., L. Bright 231, B. Bright 232, C. Bright 233, and S. Bright 234. Each online identity button may correspond to an online identity a user Mr. Bright has saved to the Web browser, and each online identity may be used for one type of intended online activity. The button, or online identity, L. Bright 231 may be used by Mr. Bright to shop for luxury goods, the button B. Bright 232 may be used by Mr. Bright to search for bargains, the button C. Bright 233 may be used by Mr. Bright to look for cars, and the button S. Bright 234 may be used by Mr. Bright to browse information about stamp collecting. In one embodiment, the online identities in the pull-down menu may be organized into a number of folders.

In one embodiment, when the user Mr. Bright hovers a cursor over an online identity button, a left side menu or right side menu 24 may be displayed. In the embodiment shown in FIG. 2, the user may be hovering a cursor over the button 234 for the online identity "S. Bright." The left/right side menu may include buttons for manipulating the corresponding online identity, e.g., a "View" button 251 for the user to look at information about the online identity "S. Bright," an "Edit" button 252 for the user to revise information about the user identity, and a "Delete" button 253 for the user to delete the online identity. In one embodiment, a password is required for manipulating the online identity information.

The pull-down menu may also include a new online identity button 235. When a user clicks on the button 235, the Web browser may display a part of an online identity information table, such as the one shown in FIG. 3, so that the user Mr. Bright may input a new online identity and information associated with it. Although in the embodiment shown in FIG. 2, the new online identity button is included in the pull-down menu, it should be understood that the new online identity button may be displayed as a button on the user interface of the Web browser, together with the button 21 for online identity management. It should also be understood that the pull-down menu may have more or fewer buttons.

In one embodiment, the online identity management tool bar may suggest to a user a number of online identities, e.g., one for luxury shopping, one for bargain hunting, and one for traveling.

FIG. 3 shows an online identity information table according to an embodiment of the present invention. In one embodiment, the table may be saved into a Web browser on a user's computer. In another embodiment, the table may be saved on a memory stick, independent from any Web browser, so that the user may use the saved online identities on other computers/Web browsers as well.

As shown, an online identity information table 300 may have a number of rows, each of which may contain information about one online identity saved by a user. Such information may include an online identity, e.g., L. Bright 231, B. Bright 232, C. Bright 233, and S. Bright 234. For the online identity L. Bright 231, the user may intend "luxury shopping" to be the type of intended online activity for this identity. The user may also save in this row a password for this online identity, and a shipping address, an email address and information about a credit card to be used with luxury shopping. Similarly, the user may intend "bargain shopping" as the type of intended online activity for the online identity B. Bright 232, "car shopping" as the type of intended online activity for the online identity C. Bright 233, and "stamp shopping" as the type of intended online activity for the user identity S. Bright 234. The user may also save a password, a shipping address, an email address, or information about a credit card associated with each online identity. The table 300 may store other information associated with the user's online identity, e.g., password used with an online identity. The Web browser may save browsing history information associated with an online identity in its row as well.

Figure 4A:
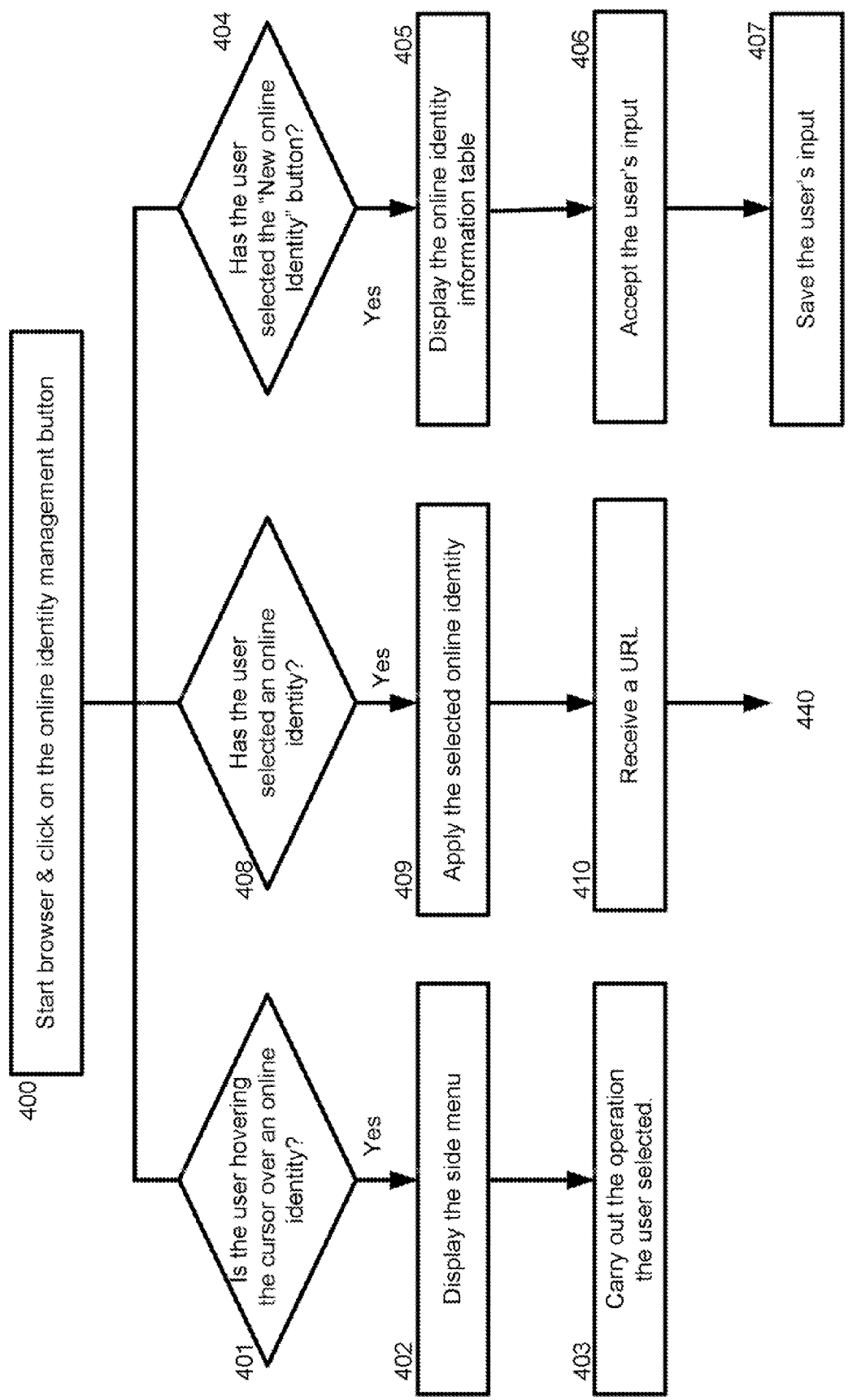
FIGS. 4A and 4B illustrate a flow chart of a method for managing online identities according to one embodiment of the present application.
Figure 4B:
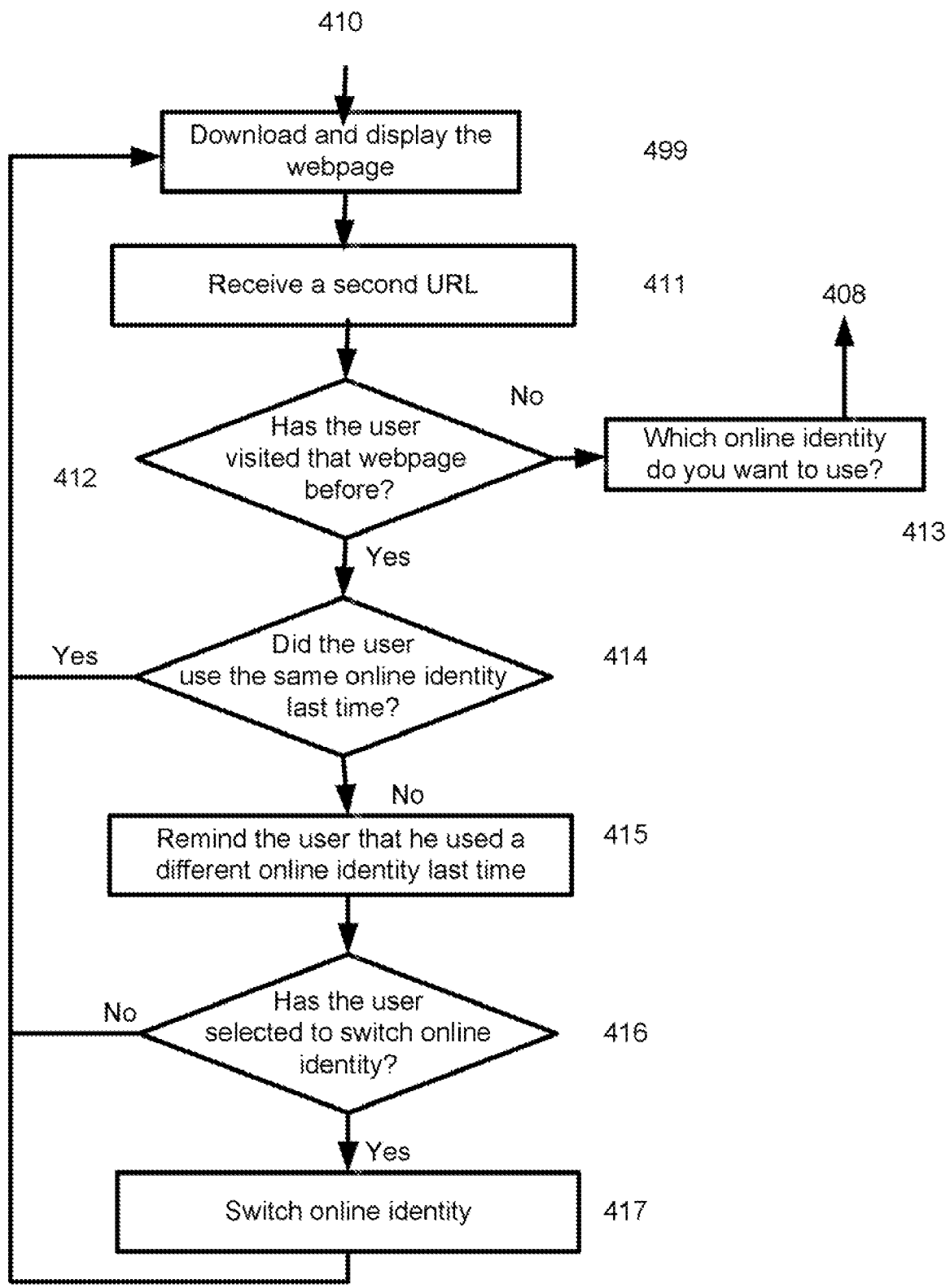

FIGS. 4A and 4B illustrate a flow chart of a method for managing online identities according to one embodiment of the present application.

At 400, the user Mr. Bright may open a browser window and click on the online identity management button 21. The pull-down menu 22 may be displayed. In one embodiment, when a user opens a browser window, the pull-down menu 22 may be automatically displayed. In one embodiment, when a user opens a browser window, the Web browser may remind the user to select an online identity by asking a question such as: Which online identity do you want to use? In one embodiment, the user may have to input a password to open the pull-down menu.

It may be determined at 401 whether the user is hovering a cursor over an online identity button. If the user is hovering a cursor over the button 234 for the online identity "S. Bright," the left side menu 24 may be displayed at 402. In one embodiment, in addition to display the side menu 24, the button 234 may be highlighted. If the user clicks on the "View" button 251, the row for the online identity "S. Bright" in the table 300 may be displayed at 403. If the user clicks on the "Edit" button 252, the row for the online identity "S. Bright" in the table 300 and a "Save" button may be displayed at 403, so that the user may update information about the online identity. If the user clicks on the "Delete" button, at 403, the online identity button 234 may be deleted from the pull-down menu 22 and information about the online identity "S. Bright" may be deleted from the table 300.

At 404, it may be determined whether the user has selected the "New online identity" button 235. If so, a part of the online identity information table 300 may be displayed at 405. The user may input information about a new online identity at 406, and save such information at 407.

At 408, it may be determined whether the user has selected an online identity. The user may select an online identity by clicking on one of the buttons 231-234. If the user clicks on, e.g., the button 231, the Web browser may set the selected online identity "L. Bright" as the user name at 409. In one embodiment, a password associated with an online identity may be required for selecting the online identity. At 410, the user may input a Universal Resource Locator (URL), such as www.saksfifthavenue.com, in the address box of the browser window and start to browse the Internet. If the website www.saksfifthavenue.com collects cookies or other type of files for its tracking function, "L. Bright" may appear as the user name in the cookies until the user changes the user name to another online identity, since the user name has been set as "L. Bright." In one embodiment, the user's IP address may be concealed to improve anonymity.

At 499, the web page of the website www.saksfifthavenue.com may be downloaded and displayed.

At 411, the user may input the URL of another website, e.g., www.amazon.com. At 412, it may be determined whether the user visited the newly input website before by using information stored in the table 300. If not, at 413, a dialog window may be displayed on the user interface of the Web browser, asking the user "Which online identity do you want to use?" The process may then return to 408. If the user has visited the website www.amazon.com before, at 414, it may be determined whether the user used the same online identity during the last visit, again by using information stored in the table 300. If yes, the process may return to 499 to display the web page. If the user used a different online identity, "B. Bright", during the last visit, at 415, a dialog window may be displayed on the user interface of the Web browser to remind the user that he used the online identity "B. Bright" during the last visit, and ask the user whether he wants to switch to that online identity.

At 416, it may be decided whether the user has selected to switch to the online identity "B. Bright." If the user has selected not to switch his online identity, the process may return to 499 to download and display the web page for www.amazon.com. If the user has decided to switch to the online identity "B. Bright", at 417, the browser window for the website www.saksfifthavenue.com may be closed, the user name may be reset to "B. Bright," a new browser window may be opened, and the process may return to 499 to download and display the web page www.amazon.com. If the website www.amazon.com collects cookies or other type of files for its tracking function, "B. Bright" may appear as the user name in the cookies until the user changes the user name to another online identity, since the user name has been reset as "L. Bright."

In one embodiment, the browser window for the website www.saksfifthavenue.com may not have to be closed. The user may open a second browser window, input www.amazon.com to the address box, and input the online identity "B. Bright" and its password. The web page for the website www.amazon.com may be displayed in the second browser window, and the user may compare information thereon with the information on the web page www.saksfifthavenue.com side by side. When the user navigates through the browser window for the website www.saksfifthavenue.com, the online identity "L. Bright" may be included in cookies as the user name, and when the user navigates through the browser window for the website www.amazon.com, the online identity "B. Bright" may be included in cookies as the user name.

Thus, the online identity management method of the present invention may switch the user name from one online identity to another seamlessly and conveniently. The user does not have to change to a different computer or a different ISP, nor does he have to close all applications and log off from the operating system he is using. If the user wants to switch to a different online identity, he may simply select the online identity he wants to use and continue his browsing session. The user also can conduct multiple browsing sessions in multiple identities in parallel on the same piece of hardware.

The method of the present invention may help users to take evasive actions against websites which track users online activities. Since the user may use as many online identities as he/she wants, each online identity may be associated with only a part of the user's online activities, but websites may regard one online identity as one user, it is difficult for websites to know the whole browsing history of the user. If a user wants to keep a part of his browsing history secret, he/she may simply create a new online identity, use that only identity for a while and then delete it. Accordingly, users' privacy is better protected.

In addition, with the method of the present invention, a user may actually benefit from websites' tracking functions. In one embodiment, the user Mr. Bright may want to buy a car, and he may use the online identity "C. Bright" to browse the Internet for relevant information. He may also use the email address cbright@123.com associated with the online identity "C. Bright" to get quotes. Consequently, car-selling websites may send their targeting advertisements and promotion to cbright@123.com. The user Mr. Bright may be also interested in stamp collecting. He may use the online identity "S. Bright" to browse websites related to stamp collecting, and use the email address sbright@123.com associated with the online identity "S. Bright" as the email address to communicate with the stamp collecting websites. In this way, the user may actively induce the information he needs and organize the information in a way he wants.

In one embodiment, when a user who usually buys luxury goods wants to look for bargains, the user may create a new online identity, and use the new online identity to run a couple of searches for bargains. By gathering, accumulating and analyzing activities associated with the new online identity, websites may conclude that the user using the new online identity is a bargain hunter, and start to send the user information about bargains or coupons.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method, comprising:

responsive to selection of a first online identity among multiple online identities for browsing a first website, using the first online identity during traversal of the first website, so that information that the first website collects relates to the first online identity;

requesting selection of a second online identity from among the multiple online identities for browsing a second website, the second online identity to be used in traversing the second website, and wherein the second online identity is either the same as or different from the first online identity, responsive to selection of the second online identity, using second online identity during traversal of the second website, so that information that the second website collects relates to the second online identity;

wherein selection of online identity occurs in a single operating system, without either changing a user login session at a browsing device, or changing a user's browsing device.

2. The method of claim 1, wherein the first online identity is associated with a first type of online activity, and the second online identity is associated with a second type of online activity.

3. The method of claim 1, wherein a password is required for selecting an online identity.

4. The method of claim 1, further comprising: displaying the first online identity and the second online identity on a browser window.

5. The method of claim 4, wherein a password is required for the displaying.

6. The method of claim 1, further comprising: storing the first online identity and its associated information in a database, wherein the associated information is selected from the group consisting of: a type of intended online activity, an email address, and a part of browsing history.

7. The method of claim 1, wherein the first online identity is included in a cookie for the first website as a user name of a user.

8. The method of claim 7, further comprising: responsive to input of a Universal Resource Locator (URL) of the second website, determining whether the user visited the second website before.

9. The method of claim 8, further comprising: if the user visited the second website before, determining which online identity the user used during the last visit.

10. The method of claim 9, further comprising: if the user used the second online identity during the last visit to the second website, asking the user which online identity the user wants to use for visiting the second website.

11. The method of claim 10, further comprising: if the second online identity is selected, switching the user name from the first online identity to the second online identity.

12. The method of claim 1, further comprising: responsive to an input, deleting one of the multiple online identities.

13. The method of claim 1, further comprising: responsive to an input, updating information about one of the multiple online identities.

14. The method of claim 1, further comprising: selecting the first online identity before the first website is accessed.

15. The method of claim 1, further comprising: accessing the first website before selecting the first online identity.

16. The method of claim 1, further comprising: concealing an IP address of the first and/or the second online identity.

17. The method of claim 1, further comprising: requesting selection of the first online identity.

18. A computer program product comprising a computer readable medium containing program instructions for performing the method of claim 1.

19. A computer program product comprising a computer readable medium containing program instructions for performing the method of claim 2.

20. A computer program product comprising a computer readable medium containing program instructions for performing the method of claim 3.

21. A computer program product comprising a computer readable medium containing program instructions for performing the method of claim 4.

22. A computer program product comprising a computer readable medium containing program instructions for performing the method of claim 5.

23. A computer program product comprising a computer readable medium containing program instructions for performing the method of claim 6.

24. A computer program product comprising a computer readable medium containing program instructions for performing the method of claim 7.

25. A computer program product comprising a computer readable medium containing program instructions for performing the method of claim 8.

* * * * *